Patented Dec. 15, 1925.

1,566,040

UNITED STATES PATENT OFFICE.

EDWIN M. PARTRIDGE, OF LANSING, AND ELWOOD W. SCARRITT, OF OAK PARK, ILLINOIS.

METHOD OF PRODUCING CHLORINE.

No Drawing. Application filed May 11, 1925. Serial No. 29,562.

*To all whom it may concern:*

Be it known that we, EDWIN M. PARTRIDGE and ELWOOD W. SCARRITT, citizens of the United States, residing at Lansing and Oak Park, in the county of Cook and State of Illinois, have invented a new and useful Improvement in Methods of Producing Chlorine, of which the following is a specification.

This invention relates to improvements in methods of producing small quantities of chlorine gas and more particularly to the production of this gas in small, accurately determinable quantities by simple and readily available means and particularly without involving the use of heat.

In accordance with this invention, we employ, as reagents for the production of chlorine, a soluble chloride salt of a metal of the alkali metal or alkaline earth metal series, and a pyrosulfate resulting from the fusion of an acid sulfate, and potassium permanganate or equivalent permanganate or dichromate.

We have found that these constituents, in substantially anhydrous form, may be mixed, for example, as powders or as fine granular substances, without substantial reaction taking place in the absence of water. Upon the addition of water to such a mixture, however, reaction takes place as exemplified by the following equation:

This reaction takes place in the cold and, it will be noted that in the reaction substantially no water is formed so that the chlorine is freely evolved.

In carrying out our invention we preferably employ common salt and sodium pyrosulfate with potassium permanganate as the reagents. The pyrosulfate and chloride are mixed in approximately reacting proportions, and this mixture is, in turn, mixed in excess with potassium permanganate. Thus, suitable proportions are 3 parts by weight of salt, 6 parts by weight of sodium pyrosulfate and 1 part by weight of potassium permanganate. When employed with an excess of the other reacting constituents, the proportion of potassium permanganate employed determines the amount of chlorine produced; thus, one gram of potassium permanganate will produce approximately 350 milliliters of chlorine.

In the use of this reacting mixture, a quantity sufficient to produce the desired amount of chlorine is placed in a suitable container, and enough water is added to moisten the mixture. In the presence of water, the reaction takes place and gradually proceeds to completion. Thus, for medical treatment by inhalation of one person in a room approximately ten feet by ten feet by ten feet in size, a quantity of the mixture containing approximately 1.5 grams of potassium permanganate is employed and 2 to 3 milliliters of water is sufficient to cause the rection to proceed. It will be noted that any excess of water present is rapidly taken up by the excess of pyrosulfate with the formation of acid sulfate and by the sulfate formed in the reaction with the formation of the crystalline sulfate. As a consequence, at the end of the reaction, a substantially dry mixture is left.

It is readily apparent that the reacting mixture may be dispensed by mixing two of the reagents and supplying the third reagent separately, so that there will be no liberation of chlorine due to atmospheric moisture. In general, however, this is not necessary, and the several constituents of the reaction mixture may be thoroughly intermingled, and preferably sealed in suitable containers in predetermined amounts and dispensed. They may likewise be prepared for use in other forms, as tablets or the like.

We claim:

1. The method of producing chlorine comprising admixing a pyrosulfate, a chloride and a permanganate in the presence of moisture.

2. The method of producing chlorine comprising admixing a pyrosulfate, a chloride and potassium permanganate, the pyrosulfate being present in excess of reacting proportions, and supplying moisture to the mixture.

3. The method of producing chlorine comprising admixing common salt, sodium pyrosulfate and potassium permanganate in the presence of moisture.

4. A reacting mixture capable of yielding chlorine on the addition of moisture comprising a pyrosulfate, a chloride and a permanganate.

5. A reacting mixture capable of producing chlorine when in the presence of moisture, comprising a pyrosulfate, a chloride and a permanganate, the proportion of pyrosulfate and chloride being in excess of reacting proportions, whereby the amount of chlorine produced is predetermined by the amount of permanganate employed.

EDWIN M. PARTRIDGE.
ELWOOD W. SCARRITT.